United States Patent
Neumann et al.

(10) Patent No.: US 6,549,777 B1
(45) Date of Patent: Apr. 15, 2003

(54) TRANSCEIVER AND A BASE STATION SYSTEM

(75) Inventors: Peter Neumann, München (DE); Jörg Sasse, München (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 09/702,028

(22) Filed: Oct. 30, 2000

Related U.S. Application Data

(63) Continuation of application No. PCT/DE99/00793, filed on Mar. 19, 1999.

(30) Foreign Application Priority Data

Apr. 29, 1998 (DE) ......................................... 198 19 212

(51) Int. Cl.⁷ ................................................ H04Q 7/20
(52) U.S. Cl. ...................... 455/435; 455/432; 455/433; 455/414; 455/558
(58) Field of Search ................................ 455/414, 418, 455/423, 424, 434, 552, 432, 435, 553, 565, 433, 558

(56) References Cited

U.S. PATENT DOCUMENTS

| | | | | |
|---|---|---|---|---|
| 5,610,973 A | * | 3/1997 | Comer | ........................ 455/413 |
| 5,613,213 A | * | 3/1997 | Naddell et al. | .............. 455/414 |
| 5,794,142 A | * | 8/1998 | Vanttila et al. | .............. 455/419 |
| 6,029,065 A | * | 2/2000 | Shah | ........................... 455/414 |
| 6,223,028 B1 | * | 4/2001 | Chang et al. | ................. 455/419 |
| 6,226,527 B1 | * | 5/2001 | Dalsgaard et al. | ........... 455/553 |

FOREIGN PATENT DOCUMENTS

GB        2 322 041 A      8/1998

OTHER PUBLICATIONS

International Publication No. WO 97/28662 (Vattila et al.), dated Aug. 7, 1997.

International Publication No. WO 97/42771 (Valentine et al.), dated Nov. 13, 1997.

"Roaming Notification and Local Service Control Through Short Message Service" (Urs), Technical Developments, Motorola, Inc., Mar. 1998, pp. 17–19.

* cited by examiner

*Primary Examiner*—Edward F. Urban
*Assistant Examiner*—Tamica M. Davis
(74) *Attorney, Agent, or Firm*—Laurence A. Greenberg; Werner H. Stemer; Ralph E. Locher

(57) ABSTRACT

The invention is based on the concept of operating a transceiver such that the service features or services, respectively, which are not supported in an interruption-free manner by the mobile radio system in which the transceiver is currently registered are automatically blocked.

6 Claims, 3 Drawing Sheets

FIG 2

| MS | LM1 | LM2 | D1 | D2 | |
|----|-----|-----|----|----|---|
| MS1 | 1 | 0 | 1 | 0 | |
| MS2 | 0 | 1 | 1 | 1 | |
| MS3 | 0 | 0 | 1 | 0 | |

MEMORY

SPE

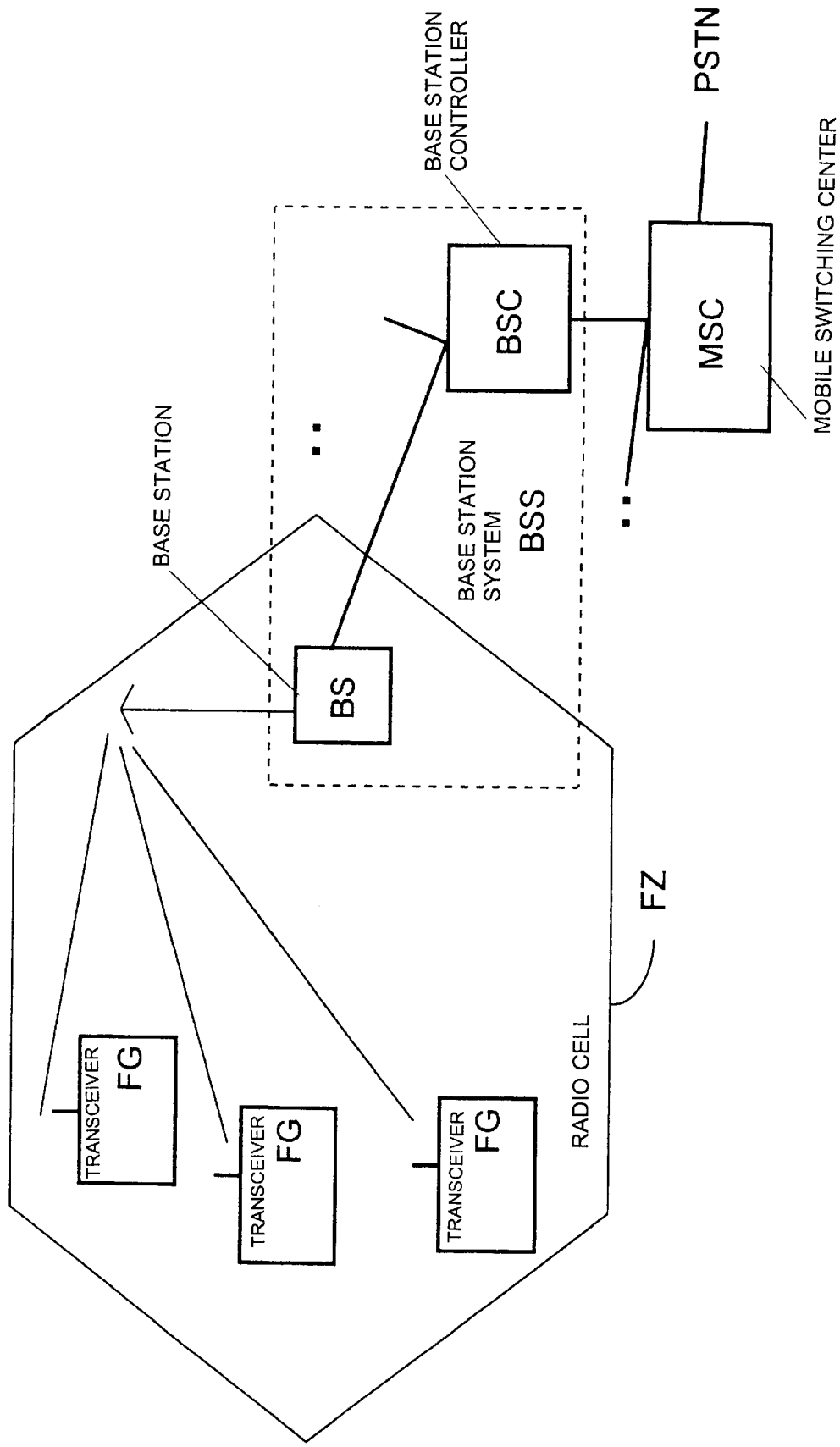

TRANSCEIVER AND A BASE STATION SYSTEM

CROSS-REFERENCE TO RELATED APPLICATION

This is a continuation of copending international application PCT/DE99/00793, filed Mar. 19, 1999, which designated the United States.

BACKGROUND OF THE INVENTION

Field of the Invention

The invention relates to a transceiver, especially a mobile radio terminal which provides different service features or which makes it possible to use different services (communication services), and to a base station system for communicating with such transceivers.

Modern mobile radio systems and the transceivers used for communicating via these systems offer an increasing number of service features or services to a user. An expert knows of many different services or service features such as: voice links, data links, transmission of short messages, calling line identification presentation, call redirection, call transfer, call waiting, advice of charge, mailbox or the different coding methods for voice connections, for example of different quality or generally the communication by different transmission standards.

There are several different mobile radio networks throughout the world which are based on different transmission standards. Mobile radio networks operating in accordance with the GSM (global system for mobile communication) system are widely used. The entire GSM service area worldwide is covered by a number of small PLMN (public land mobile network) service areas. Here, one PLMN service area is operated by one operator. Two or more PLMN service areas can overlap within a country. Each PLMN service area is unambiguously identifiable by identifiers such as the mobile network code MNC.

Within a PLMN service area, the GSM standard and the services and service features contained in the standard and possibly also services and service features not contained in the standard are uniformly implemented and made available for use.

Although different PLMN service areas are based on a uniform transmission standard, there can be different implementations or provisions of service features or services depending on the PLMN service area due to different manufacturers, network operators or the time when the mobile radio network was commissioned.

Due to international roaming agreements between the network operators of the different PLMN service areas, it is possible, if required, for example during a stay in a foreign country, to communicate with a transceiver in a PLMN service area other than the one normally used. Due to the abovementioned PLMN-service-area-dependent implementation or provision of services and service features, there can be service-specific or service-feature-specific functional disturbances involving the transceiver. These problems can become more severe in future transceivers which can communicate via different transmission standards, so-called multimode transceivers.

In the text which follows, a PLMN service area will be called a mobile radio system. Within the context of the present application, the term "mobile radio system" generally describes a mobile radio system which essentially exhibits uniform implementation and provision of services and service features, is unambiguously identifiable by one or more identifiers associated with the mobile radio system and is operated, as a rule, by a network operator.

SUMMARY OF THE INVENTION

It is accordingly an object of the invention to provide a transceiver and a base station system which overcome the above-mentioned disadvantages of the prior art apparatus of this general type such that interruption-free communication with a transceiver is allowed in different mobile radio systems.

The invention is thus based on the concept that the part of the service features or services supported by a transceiver, which are not supported in a working manner (also referred to herein as an interruption-free manner) by the mobile radio system in which the transceiver is registered, are automatically blocked.

With the foregoing and other objects in view there is provided, in accordance with the invention a transceiver that includes means for communicating via mobile radio systems; means for performing a function selected from the group consisting of providing different service features, using different service features, providing different services, and using different services; means for storing information selected from the group consisting of information regarding mobile radio systems, information regarding service features that are supported by the mobile radio systems, and information regarding services that are supported by the mobile radio systems; and means for automatically selectively blocking at least some functions selected from the group consisting of service features and services in dependence on the mobile radio system in which the transceiver is currently registered and in dependence on the stored information regarding the mobile radio system in which the transceiver is currently registered.

In accordance with an added feature of the invention, at least a part of the service features or services is automatically selectively blocked in dependence on stored information on mobile radio systems and service features or services supported by the mobile radio systems in an essentially interruption-free manner, and in dependence on the mobile radio system in which the transceiver is currently registered.

The result is that, in mobile radio systems which do not support certain service features or services, these service features or services are automatically blocked and, as a result, interruption-free operation of the transceiver is ensured.

In accordance with an additional feature of the invention, information on the mobile radio systems and service features or services supported by these are transmitted to the transceiver via a mobile radio system and are automatically stored.

Thus, it is possible that, when the service features or services supported are changed, the corresponding information can be simply updated.

In accordance with another feature of the invention, should functional disturbances occur, service features and services which are not necessary for a basic function of the transceiver are automatically blocked.

In accordance with a concomitant feature of the invention, by including the invention in future multimode transceivers, interruption-free operation of the transceivers can be ensured. This is especially so in a transition phase in which, for example, existing GSM mobile radio networks are extended to form wideband CDMA mobile radio networks, even though different mobile radio systems are supporting different service features or services or transmission methods, for example FDD (frequency division duplex) or TDD (time division duplex) mode.

Other features which are considered as characteristic for the invention are set forth in the appended claims.

Although the invention is illustrated and described herein as embodied in a transceiver and a base station system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 2 shows a diagrammatic representation of a storage means; and

FIG. 3 shows a block diagram of a mobile radio system.

DESCRIPTION OF THE PREFERRED EMBODIMENTS

Figure 1:
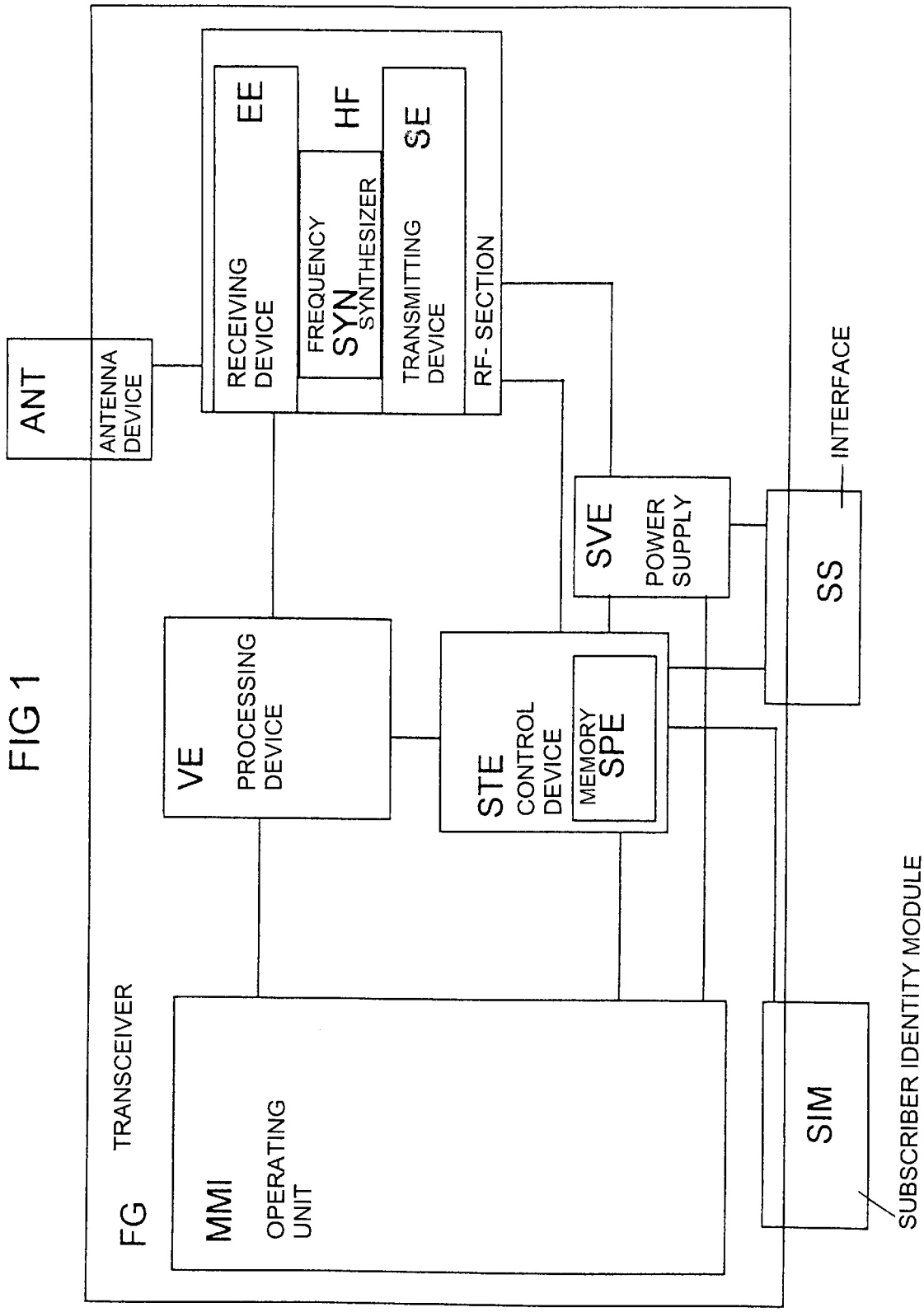
FIG. 1 shows a block diagram of a transceiver.

Referring now to the figures of the drawing in detail and first, particularly, to FIG. 1 thereof, there is shown a transceiver FG for using different service features or services of a mobile radio system. The transceiver FG includes an operating unit MMI, a control device STE, a processing device VE, a power supply device SVE, a subscriber identity module SIM, an interface SS for data transmission and for power supply, an antenna device ANT, and a radio-frequency section HF including a receiving device EE, a transmitting device SE, and a frequency synthesizer SYN. The individual elements of the transceiver FG are also connected to one another by conductor tracks, wires, cables or bus systems.

The control device STE essentially consists of a software-controlled microcontroller and the processing device VE consists of a digital signal processor, both of which are able to access memory chips SPE in a read and a write mode. The microcontroller controls and checks all essential elements, functions, service features and services of the transceiver FG and essentially controls the communication and signaling flow.

The analog audio signals and the analog signals originating from the radio-frequency section HF are converted into digital signals by analog/digital converters and are processed by the digital signal processor. After the processing, the digital signals are reconverted into analog audio signals and analog signals to be supplied to the radio frequency section HF by means of digital/analog converters. For this purpose, a modulation and, respectively, demodulation are carried out, if necessary.

The program data that are needed for controlling the transceiver FG, the communication sequence, the signaling procedures, and the service features and the services are stored in the volatile or non-volatile memory chips SPE. Device information, information entered by the user and information arising during the processing of signals are also stored in the volatile or non-volatile memory chips SPE.

In addition, the transceiver FG has a slot for a subscriber identity module SIM or a corresponding element, which is possibly installed permanently, for storing subscriber-specific information or network-specific information.

FIG. 2 shows memory chips SPE in which are stored information on different mobile radio systems MS and, respectively, of the corresponding identifiers and the service features LM or services D supported by these mobile radio systems MS. This information can be stored in the form of a table in the storage chips SPE of the transceiver FG or in the subscriber identity module SIM.

If a user, who normally communicates via a mobile radio system in Germany such as, for example, the D1 network MS1, travels into another country, then either after corresponding hand-over and location area update procedures or after the transceiver FG has been registered in a mobile radio system MS3 of another network operator, the transceiver FG is supplied, via the new mobile radio system MS3, with its system-specific identifier. This system-specific identifier can be, for example, the mobile network code MNC or the location area identity LAI. If necessary, information about this is stored.

After that, the control device STE of the transceiver FG reads, from the storage means such as memory chips SPE, the information on what service features LM1, LM2 or services D2, respectively, are not supported by this mobile radio system MS3 and blocks the corresponding service features LM1, LM2 and services D2 and takes into consideration the blocking of these service features LM1, LM2 and services D2 in following signaling procedures such as the setting-up of a connection. As long as the user stays in this mobile radio system MS3, these service features LM1, LM2 and services D2 are not available to him.

Since new mobile radio systems are continuously being set up and existing mobile radio systems are being extended further and as additional service features LM and services D or other technical implementations of existing service features or services become available to the user in the course of time in the different mobile radio systems MS, this information should be advantageously updated from time to time. In this context, the following embodiments of the invention are possible:

The updating of the information, i.e. a new storage of the information in the table shown in FIG. 2, can be done via an interface SS of the transceiver FG like the first storage of the information. This can be done, for example, by means of a personal computer of the manufacturer or of the network operator. It is also possible to update the information via the operating unit MMI of the transceiver FG.

The information can also be transmitted via at least a part of the mobile radio systems MS, for example the mobile radio system normally used by the user, to the transceiver FG and automatically stored there. User or signaling channels can be used for this purpose. This information can also be transferred at regular or irregular intervals as a broadcast message. In one variant of the embodiment, this information is transmitted whenever the location area of the transceiver FG has changed. Thus, an updating of the information can be triggered when the identifier of the location area or of the network operator or of the mobile radio system, respectively, has changed or a location area update procedure is executed. It is also possible for the updating to be triggered when the transceiver FG is registered in a mobile radio system.

Another variant of the embodiment of the invention provides that all service features or services which are not necessary for a basic operation of the transceiver FG are automatically blocked in the transceiver FG in the case of any occurring functional disturbances. In this context, basic function is also understood to mean a simple voice connection with rugged voice coding. Other advantageous basic functions can also be easily defined by an expert.

The structure of the mobile radio system shown in FIG. 3 corresponds to a known GSM mobile radio system which consists of a plurality of mobile switching centers MSC which are networked together or, respectively, establish access to a land line network PSTN. Furthermore, these mobile switching centers MSC are connected to in each case at least one base station controller BSC. Each base station controller BSC, in turn, provides access to at least one base station BS. Such a base station BS is a radio station which can set up a radio link to transceivers FG via an air interface. The range of the signals of a base station BS is essentially defined by a radio cell FZ. The allocation of resources such as frequency bands to radio cells and thus to the data sequences to be transmitted can be controlled by control devices such as, for example, the base station controller BSC. Base stations BS and a base station controller BSC can be combined to form a base station system BSS.

The base station system BSS is also responsible for the radio channel administration, the data rate adaptation, the monitoring of the radio transmission link, hand-over procedures and connection control and mobility administration and transfers the information necessary for this to the transceivers FG. The base station system BSS is also responsible for transferring the information on mobile radio systems and the services and service features supported by these for updating the stored information. This transfer can also be carried out via signaling channels or traffic channels.

In the text which follows, the invention will be explained illustratively by means of the voice coding in a GSM system.

In GSM mobile radio systems, a half-rate (HR) voice codec, which makes it possible to transmit the voice information at half the data rate via a half-rate traffic channel and thus to double the number of calls that can be made in parallel via a base station BS, is provided as an option instead of the full-rate (FR) voice codec originally used.

An increasing number of mobile radio systems MS and transceivers FG support this dual-rate support service feature LM, which makes it possible to compress voice optionally either by means of the full-rate (FR) voice codec or the half-rate (HR) voice codec.

Certainly, the situation can occur that a dual-rate support transceiver FG is registered in a full-rate support-only mobile radio system which does not support this dual-rate support service feature LM and also does not, or does not reliably, transfer information to the transceiver FG that it does not support this dual-rate support service feature LM, at least during a transition phase.

In this case, a conventional transceiver transfers information on the voice codecs supported by it to the mobile radio system (dual-rate support transceiver). A special or faulty implementation of this service feature (full-rate support and/or dual-rate support) in the mobile radio system can lead to the mobile radio system not being able to respond to this information in a suitable manner by providing either a half-rate link or by transferring suitable control information for using the full-rate voice codec to the transceiver. When conventional transceivers are used, this results in disturbances so that, for example, the transceiver cannot establish any connection to the mobile radio system at all.

After an embodiment of a transceiver FG according to the invention has been registered in such a mobile radio system MS, the corresponding information (mobile radio system MS does not support dual-rate support) is read out of the memory chip SPE by the control device STE of the transceiver FG. The dual-rate voice codec service feature of the transceiver FG is blocked in the device and the transceiver FG registers as a full-rate support-only transceiver in the mobile radio system. This avoids disturbances and a connection can be set up.

This service feature blocking can be applied analogously to the enhanced full-rate codec.

In multimode transceivers FG which, for example, can communicate via existing GSM mobile radio networks and future wideband CDMA mobile radio networks or via FDD (frequency division duplex) or TDD (time division duplex) systems, information on the different mobile radio systems and the transmission standards or transmission methods supported by them, for example, is stored in the memory chips SPE. If necessary, the multimode transceiver FG is blocked for certain transmission standards or transmission methods or transmission systems analogously to the implementation specified above.

We claim:

1. A transceiver, comprising:
    means for communicating via a mobile radio system offering a plurality of services;
    means for performing a function selected from the group consisting of providing different service features and using different service features;
    means for storing information selected from the group consisting of information regarding mobile radio systems and information regarding service features supported by the mobile radio systems; and
    means for automatically selectively blocking at least one service feature in dependence on the mobile radio system in which the transceiver is currently registered and in dependence on the information stored in the transceiver regarding the mobile radio system in which the transceiver is currently registered.

2. The transceiver according to claim 1, wherein the means for storing information is configured to automatically store information that is transmitted via at least a portion of a mobile radio system.

3. The transceiver according to claim 1, wherein the means for storing information is configured to automatically store information after the transceiver has been registered in a mobile radio system.

4. The transceiver according to claim 1, comprising a component for updating the stored information, said component selected from the group consisting of an operating device and an interface.

5. The transceiver according to claim 1, wherein said means for automatically selectively blocking is configured such that in the event of any occurring functional disturbance, all functions selected from the group consisting of service features and services that are not necessary for a basic operation of the transceiver are automatically blocked.

6. The transceiver according to claim 1, comprising means for communicating via different mobile radio systems in accordance with different transmission standards.

* * * * *